Nov. 16, 1948.   F. R. LONG   2,454,072
COMBINED PIPE UNION AND CHECK VALVE
Filed Aug. 4, 1944
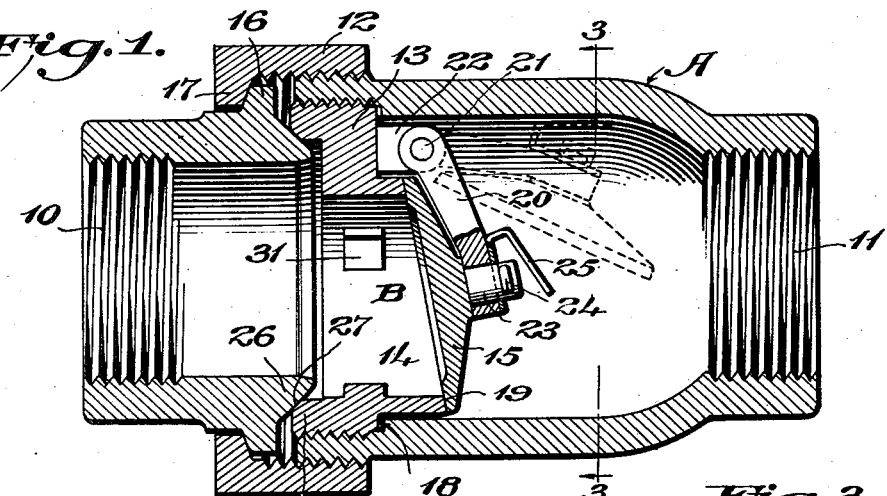
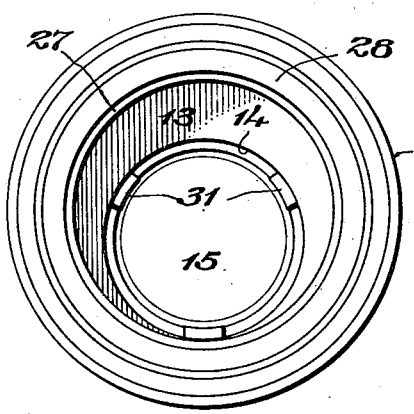
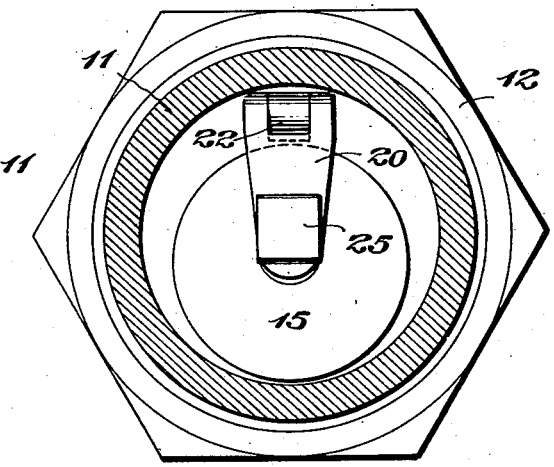
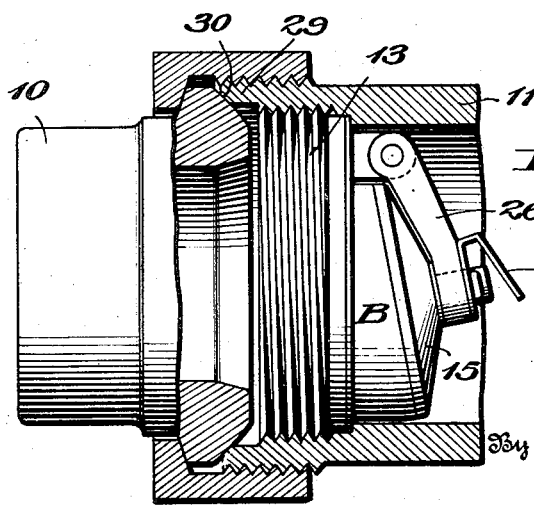
Inventor
Fred R. Long,
By
Attorney Patented Nov. 16, 1948

2,454,072

UNITED STATES PATENT OFFICE 2,454,072

COMBINED PIPE UNION AND CHECK VALVE

Fred R. Long, Catawissa, Pa.

Application August 4, 1944, Serial No. 548,089

2 Claims. (Cl. 251—123)

This invention relates to a combined pipe union and check valve, and has for its general object to provide a simple, practical, strong and sturdy combination of this kind in which the check valve is in the form of a complete unit to be threaded into one of the elements of the pipe union to check or deny flow of fluid through the union in one direction.

With the foregoing general object in view, the invention consists in a combined pipe union and check valve embodying the novel features of construction, combination and arrangement of parts as will be hereinafter more fully described, illustrated in the accompanying drawings and defined in the appended claims.

In the accompanying drawings, wherein like characters of reference denote corresponding parts in the different views:

Figure 1 is a central, longitudinal section through a combined pipe union and check valve constructed in accordance with one practical embodiment of the invention.

Figure 2 is an end view of the check valve unit and of the female element of the pipe union in which it is threaded.

Figure 3 is a cross section on the line 3—3 of Fig. 1; and

Figure 4 is a fragmentary view similar to Fig. 1 illustrating an alternative construction.

Referring to the drawings in detail, A designates, generally, the present pipe union which is composed, as usual, of a pair of male and female sleeve elements 10 and 11, respectively, connected together by a nut 12, and B designates, generally, the present check valve unit which is composed in the present instance of a base 13 having a port 14 therein and a valve 15 for controlling flow of fluid through said port.

At their outer ends the sleeve elements 10 and 11 may be either internally or externally threaded or otherwise suitably formed for connection with a pair of pipe elements to be coupled together by the union A. In any event, the inner end portion of the female sleeve element 11 is externally threaded, the male sleeve element 10 is provided adjacent to its inner end with an outwardly projecting annular flange 16, and the nut 12, which is internally threaded and provided with an inwardly projecting annular flange 17, is threaded onto the inner end portion of said female sleeve element 11 and has its flange 17 engaging the outer side of the flange 16 of the male sleeve element 10 whereby said sleeve elements are separably coupled together.

The inner end portion of the female sleeve element 11 also is internally threaded and has threaded therein the base 13 of the check valve unit B. Moreover, said female sleeve element 11 is provided with an internal annular shoulder 18 which serves as a stop to limit movement of the base 13 into said sleeve element and thus to predetermine the operative position of said base relative to said sleeve element.

The port 14 extends through the base 13 and is controlled by a disk-type check valve 15 which cooperates with a seat 19 at the inner end of said base surrounding said port.

Preferably the check valve 15 is mounted to swing between open and closed positions, to which end it may be carried, as shown, by the free end of an arm 20 which, at its other end, may be pivoted, as indicated at 21, to a post 22 projecting from one end of the base 13.

While the valve 15 may be mounted on the arm 20 in any suitable manner, it preferably is mounted for free rotation and for a limited amount of tilting movement relative to said arm so that it may readily accommodate itself to the seat 19. To this end, it may be provided with a pin 23 extending more or less loosely through an opening in the free end of the arm 20 and may be retained in assembly with said arm by a cotter pin 24 extending through said pin 23.

Preferably yieldable means is provided to cushion opening movements of the check valve 15, and while this means may be of any suitable form, it preferably consists, as shown, of a spring leaf element 25 of substantially U-shape having one end engaged with the pin 23 and retained thereon between the arm 20 and the cotter pin 24 and having its other end free and diverging from the base of the said first end or leg of the spring for cushioning engagement with the side wall of the female sleeve element 11 when the valve 15 swings to its open position as shown by dotted lines in Fig. 1.

At its inner end, the male sleeve element 10 is provided with an annular flange 26 the outer face of which is tapered and preferably of spherical contour, and in accordance with the invention the said outer face of said flange may engage a seat on either the base 13 of the check valve B or on the female sleeve element 11 to provide a flexible, fluid-tight seal between the respective sleeve elements 10 and 11 of the union A when the nut 12 is tightened to draw said sleeve elements together.

According to the Figs. 1 to 3 construction, the outer face of the flange 26 engages an annular, tapered seat 27 formed at the inner edge of an annular flange 28 on the end of the base 13 opposite the end thereof which carries the valve 15. On the other hand, according to the Fig. 4 construction, the inner end portion of the female sleeve element 11, extends inwardly beyond the base 13 of the check valve unit in the form of an annular flange 29, and the outer face of the flange 26 of the male element 10 engages a tapered seat 30 formed at the inner edge of said flange 29. In either case a fluid-tight seal is afforded between the sleeve elements of the union and, at the same time, said sleeve elements are permitted to pivot relative to each other to accommodate themselves to any lack of alinement between pipe sections with which they may be connected. In other respects the Figs. 1 to 3 and the Fig. 4 constructions are, or may be, the same.

The base 13 of the check valve unit may be provided with any suitable means to facilitate screwing of the same into and from the female sleeve section 11. For example, said base 13 may be provided with wrench-engageable lugs 31 projecting into the port 14.

While the sleeve elements 10 and 11 may be of any suitable construction, they preferably are seamless forgings whereby any possibility of the same cracking or splitting in service is practically eliminated.

According to both forms of the invention the elements 10, 11 and 13 may be formed from any suitable materials. For practical purposes, however, the elements 10 and 11 preferably are formed from steel and the element 13 preferably is formed from bronze. Thus, in instances where the fluid to be controlled is not under high pressure or temperature and where a steel to bronze seal is desired, the Figs. 1 to 3 construction is preferred as it is most practical to form the elements 10 and 11 of steel and the element 13 of bronze. On the other hand, if the fluid to be controlled is under high pressure or temperature and a steel to steel seal is desired, the Fig. 4 construction is preferred. However, if the fluid to be controlled contains destructive acids, the element 13 as well as the elements 10 and 11 may be formed from stainless steel, Monel metal or any other suitable metal which is resistant to the acids, and in that case either form of the invention may be preferred to the other for certain installations.

From the foregoing description considered in connection with the accompanying drawings, it is believed that the construction and operation of the invention will be clearly understood and its advantages appreciated. It is desired to point out, however, that while only certain specific structural forms of the invention have been illustrated and described, the same is readily capable of embodiment in specifically different structural forms within its spirit and scope as defined in the appended claims.

I claim:

1. A combined pipe union and check valve comprising male and female sleeve elements disposed in end to end relationship to each other, a nut connecting said sleeve elements together, a check valve unit mounted in one of said sleeve elements, said unit including a base having a port, an arm pivoted at one end to said base and having its other end free and provided with an opening, a disk-type check valve having a pin of smaller diameter than said opening extending through said opening to permit rocking movement of said pin therein, said pin having a transverse opening therethrough adjacent its end, quick detachable and replaceable means in said pin opening cooperating with said arm to retain said valve in assembly with the latter for swinging movement therewith to control flow of fluid through said port, and a leaf spring element having two diverging legs, one of said legs being engaged with said pin and retained thereon by said detachable and replaceable means and having its other leg free to engage the inner wall of the sleeve element in which said check valve unit is mounted to cushion opening movements of said check valve.

2. A combined pipe union and check valve comprising male and female sleeve elements disposed in end to end relationship to each other, a nut connecting said sleeve elements together, a check valve unit mounted in one of said sleeve elements, said unit including a base having a port, an arm pivoted at one end to said base and having its other end free and provided with an opening, a disk-type check valve having a pin of smaller diameter than said opening extending through said opening to permit rocking movement of said pin therein, said pin having a transverse opening therethrough adjacent its end, a cotter pin extending through said opening in the said valve pin to retain said valve in assembly with the said arm for swinging movement therewith to control the flow of fluid through said port, and a flat U-shaped spring having diverging leg portions, one of said legs having an opening therein and between detachably mounted around the said valve pin between the end of said arm and the said cotter pin, and the other of said legs being angularly positioned at a predetermined angle over the end of said valve pin, to thereby cushion the opening movement of said valve by engagement of the free end of the said other of the legs against the inner wall of the sleeve element containing said valve unit.

FRED R. LONG.

REFERENCES CITED

The following references are of record in the file of this patent:

UNITED STATES PATENTS

| Number | Name | Date |
|---|---|---|
| 107,605 | Foster | Sept. 20, 1870 |
| 353,430 | Reynolds | Nov. 30, 1886 |
| 459,576 | Goehring | Sept. 15, 1891 |
| 996,099 | Leidecker | June 27, 1911 |
| 1,286,672 | Lindgren | Dec. 3, 1918 |
| 1,354,440 | Mowry | Sept. 28, 1920 |
| 2,068,833 | White | Jan. 26, 1937 |

FOREIGN PATENTS

| Number | Country | Date |
|---|---|---|
| 74,295 | Sweden | May 13, 1932 |
| 238,052 | Great Britain | Aug. 13, 1925 |